United States Patent [19]

Huber

[11] Patent Number: 4,825,697

[45] Date of Patent: May 2, 1989

[54] ACCELERATION SENSOR

[75] Inventor: Werner Huber, Schwaikheim, Fed. Rep. of Germany

[73] Assignee: Robert Bosch GmbH, Stuttgart, Fed. Rep. of Germany

[21] Appl. No.: 137,020

[22] PCT Filed: Apr. 2, 1987

[86] PCT No.: PCT/DE87/00145

§ 371 Date: Nov. 13, 1987

§ 102(e) Date: Nov. 13, 1987

[87] PCT Pub. No.: WO87/06347

PCT Pub. Date: Oct. 22, 1987

[30] Foreign Application Priority Data

Apr. 11, 1986 [DE] Fed. Rep. of Germany ....... 3612187
Feb. 11, 1987 [DE] Fed. Rep. of Germany ....... 3704209

[51] Int. Cl.$^4$ ............................................. G01P 15/08
[52] U.S. Cl. ................. 73/517 R; 73/517 A; 73/526; 73/DIG. 3
[58] Field of Search ................. 73/517 R, 517 A, 526, 73/651, 430, DIG. 3

[56] References Cited

U.S. PATENT DOCUMENTS 2,656,519 10/1953 Sheppard ........................... 73/517 A
4,065,974 1/1978 Euer et al. ............................ 73/430
4,156,366 5/1979 Euer .................................. 73/517 B
4,218,614 8/1980 Miller ................................. 73/655
4,498,341 2/1985 Breitbach et al. ................. 73/517 R

FOREIGN PATENT DOCUMENTS 3016001 10/1981 Fed. Rep. of Germany .... 73/517 R
3021317 12/1981 Fed. Rep. of Germany .... 73/517 R Primary Examiner—John Chapman
Attorney, Agent, or Firm—Michael J. Striker

[57] ABSTRACT

The acceleration sensor consists substantially of a leaf spring (12) with an eddy current disk (13), which is arranged at its free end as an inertia mass, and an eddy current brake with magnets which are polarized in opposite directions (16, 17), and a flux conducting piece consisting of low reluctance iron. The latter serves the purpose of oscillation damping of the spring-mass system formed by the leaf spring (12) and eddy current disk (13). By means of a sensor magnet (19) and a Hall element (20), the lift of the inertia mass is transformed into output voltage which is proportional to the acceleration. Such an acceleration sensor is installed in a motor vehicle, for example, and serves to trigger safety devices such as belt tighteners. It has the advantage that the frequency response is only slightly dependent upon temperature and is very simply and compactly constructed.

10 Claims, 2 Drawing Sheets

U.S. Patent    May 2, 1989    Sheet 2 of 2    4,825,697
Fig 5
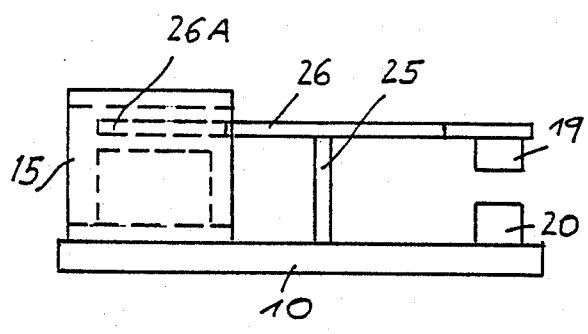
Fig 6
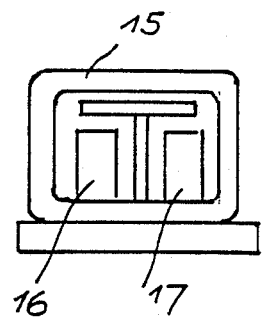
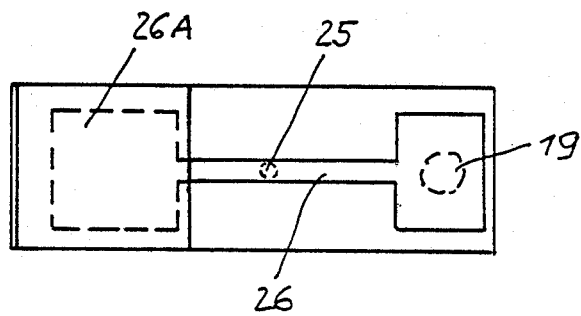
Fig 7

ACCELERATION SENSOR

BACKGROUND OF THE INVENTION

The invention is directed to an acceleration sensor. Known sensors use liquids, e.g. oil, as damping means; however, this has the disadvantage that the damping or the frequency response is dependent upon viscosity and, accordingly, vary dependent upon temperature. Accordingly, an additional measurement error results in the measurement of accelerations which change with respect to time. Moreover, sealing means are necessary in order to separate the electric or electronic signal processing device from the liquid in an absolutely leak-proof manner and to prevent the leakage of liquid. This makes the acceleration sensor more expensive.

SUMMARY OF THE INVENTION

An acceleration sensor according to the invention provides for a damping or frequency response to have only a slight dependence on temperature and is designed so as to be very simple, inexpensive, and also light.

By means of using a leaf spring or spring band or a torsion spring and, for example, a Hall element as sensor, the device is constructed so as to be particularly compact and light. The sensor can also be constructed, in particular, as an angular acceleration sensor.

BRIEF DESCRIPTION OF THE DRAWING

Two embodiment examples of the invention are shown in the following drawing and are explained in more detail in the description.

FIG. 5 shows a side view of an angular acceleration sensor;

FIG. 6 shows a view from the back; and

FIG. 7 shows a top view of an individual part of the sensor.

DESCRIPTION OF THE PREFERRED EMBODIMENTS

Figure 1:
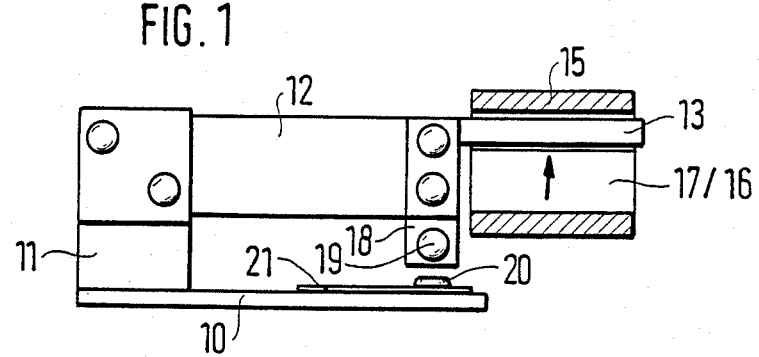
FIG. 1 shows a side view of a first acceleration sensor.
Figure 2:
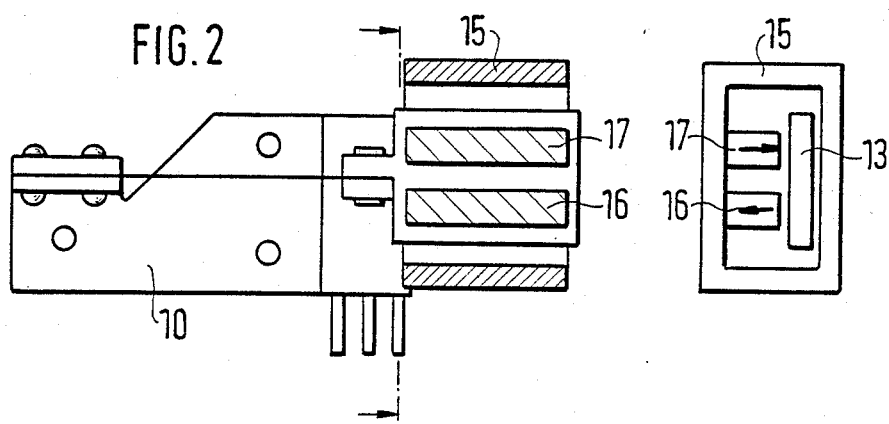
FIG. 2 shows a top view.
Figure 3:
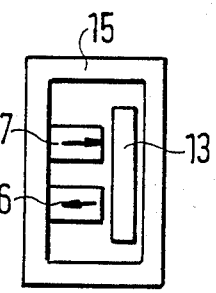
FIG. 3 shows a view in the direction of the arrow.

A base plate 10 of an acceleration sensor is shown and from which a web 11 extends upwardly at a right angle. A leaf spring 12, which is constructed so as to be approximately rectangular and extends so as to be parallel edgewise to the base plate 10, is fastened at the web 11, particularly by means of spot welding. An eddy current disk 13, which is likewise constructed so as to be approximately rectangular and extends in a horizontal manner transversely relative to the leaf spring 12, is fastened at the free end of the leaf spring 12, also paticularly by means of spot welding. The eddy current disk immerses in a cage-shaped flux conducting piece 15 which preferably consists of low-reluctance material. Two square brake magnets 16, 17, which extend toward the brake disk 13 but do not contact it, are arranged in the flux conducting piece 15 at a distance from one another. The width of the flux conducting piece 15 is somewhat greater than the width of the eddy current disk 13, so that the latter can oscillate without difficulty in the flux conducting piece.

At the free end of the leaf spring 12, that is, where the eddy current disk 13 begins, a prolongation 18 extends toward the base plate 10. A sensor magnet 19 is arranged at the lower end of the prolongation 18 and cooperates with a Hall element 20 which is located opposite it and which is fastened at the base plate 10. Evaluating circuits 21 are applied to the base plate adjacent to the Hall element by means of thick- or thin-film technology.

The eddy current disk 13, together with the flux conducting piece 15 and the brake magnets 16, 17, forms an eddy current brake. The brake magnets are magnetized in opposite directions. Because of this magnetization in opposite directions, the magnetic field in the air gap between the eddy current disk 13 and the brake magnets 16, 17 is very inhomogenous, so that the eddy current generation is benefited during the oscillation of the eddy current disk.

Figure 4:
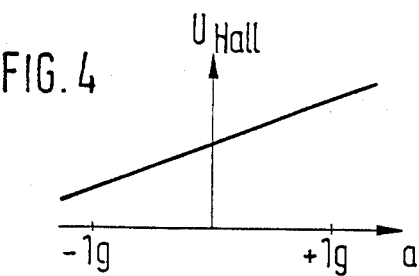
FIG. 4 shows a diagram.

By way of example, the acceleration sensor is arranged so as to be perpendicular with respect to the traveling direction of a motor vehicle. The inertia mass in the form of the eddy current disk 13 at the end of the leaf spring 12 is deflected in proportion to the acceleration acting perpendicular relative to the leaf spring. The deflection is determined by means of the spring constant of the leaf spring and the inertia mass. The eddy current damping is effected by means of the movement of the inertia mass—particularly the eddy current disk 13—in the air gap of the magnetic circuit. The oscillation energy is decreased by means of the eddy currents induced during the oscillation. Every desired damping can be achieved by means of a suitable design of the system comprising the leaf spring and magnetic circuit system. The lift of the inertia mass is measured by means of the sensor magnet 19 and the Hall element 20 and is converted into a proportional output voltage, see the diagram according to FIG. 4.

The eddy current disk 13 advisably consists of high-grade aluminum or copper, the leaf spring advisably consists of tombac.

Aside from oscillation damping, the magnetic circuit simultaneously serves as a mechanical stop so that the leaf spring is prevented from being damaged during the occurrence of acceleration peaks. For example, by means of the acceleration sensor, passenger safety devices, e.g., belt tighteners, can be actuated in a motor vehicle, or, in another instance, the delay occurring during deceleration of the vehicle can be measured and the action of an antiskid system can be improved with this signal.

In the angular acceleration sensor, according to FIGS. 5, 6 and 7, a torsion rod 25 is fastened vertically on the base plate 10 and a double arm 26, which extends parallel to the base plate 10, is fastened at its tip. The sensor magnet 19 is fastened, in turn, on one of these, the opposite end forming the eddy current brake disk 26A which immerses in the flux conducting piece 15. The latter is fastened on the base plate 10 and receives the two brake magnets 16, 17. The manner of operation follows in a self-evident manner from the embodiment example which was described first, the only difference being that an acceleration of the angle of rotation is now detected, measured and damped by means of rotating the torsion rod. A torsion wire or another low friction support can also be used instead of a torsion rod.

It is advantageous if the magnetization of the sensor magnet is directed in the movement direction so that there is a linear relationship between the acceleration to be measured and the output voltage of the Hall element.

I claim:

1. An acceleration sensor comprising: a spring-mass system including an inertia mass in the form of an eddy current disc secured to a spring so as to move in response to acceleration; an eddy current damping system including a flux conducting housing having two pairs of facing walls and an open lateral side, two oppositely polarized magnets arranged side by side on an inner surface of a wall of the housing and being spaced by an air gap from the opposite housing wall, said eddy current disc projecting through said open lateral side into said housing to move in said air gap whereby a non-uniform magnetic field in said air gap damps the movement of said eddy curent disc; and a displacement measuring system including a sensor magnet attached to said spring, and a Hall element arranged at a distance from said housing for sensing acceleration dependent displacement of said sensor magnet.

2. The sensor as defined in claim 1, wherein said spring is formed as a torsion element (25) with a double arm (26) fastened thereto, said double arm (26) having two ends, said sensor magnet (19) being arranged at a first of said two ends, and said eddy current disc being arranged at a second of said two ends.

3. The sensor as defined in claim 2, wherein said torsion element is formed as a torsion rod.

4. The sensor as defined in claim 2, wherein said torsion element is formed as a torsion wire.

5. The sensor as defined in claim 1, wherein said housing is formed to simultaneously serve as a mechanical stop of said eddy current disc so as to prevent said spring from becoming damaged during an occurrence of acceleration peaks.

6. The sensor as defined in claim 1, wherein said Hall element produces an output voltage, said mass-spring system having a direction of movement along which said acceleration takes place, said sensor magnet having a magnetization directed in said direction of movement so that a linear relationship exists between said acceleration to be determined and said output voltage of said Hall element.

7. The sensor as defined in claim 1, wherein said flux conducting housing (15) has a width greater than that of said eddy current disc (13).

8. A sensor as defined in claim 1 wherein said flux conducting housing is composed of a low reluctance material.

9. A sensor as defined in claim 1 wherein said spring is formed as a leaf spring having two opposite major sides, a fixed end and an opposite free end, said eddy current disc being secured to said free end such that its major sides form right angles with the major sides of said leaf spring, and said disc moving in an air gap between said magnets and an opposite inner wall of said housing.

10. The sensor as defined in claim 9, wherein said eddy current disc is composed of a material selected from the group consisting of high-grade aluminum and copper, said leaf spring being composed of tombac.

* * * * *